United States Patent
Cremers et al.

(10) Patent No.: US 8,603,694 B2
(45) Date of Patent: Dec. 10, 2013

(54) METHOD FOR OPERATING FUEL CELLS FOR SYSTEMS THAT ARE RESTRICTED BY EXPOSURE TO THERMAL STRESS AND FUEL CELL STACK FOR CARRYING OUT SAID METHOD

(75) Inventors: Carsten Cremers, Hohenkammer (DE); Wolfgang Scholkopf, Munich (DE); Ulrich Stimming, Munich (DE)

(73) Assignee: ZAE Bayern Bayerisches Zentrum für angewandte Energieforschung e.V., Garching (DE)

( * ) Notice: Subject to any disclaimer, the term of this patent is extended or adjusted under 35 U.S.C. 154(b) by 1284 days.

(21) Appl. No.: 11/816,181

(22) PCT Filed: Feb. 11, 2006

(86) PCT No.: PCT/DE2006/000254
§ 371 (c)(1),
(2), (4) Date: May 5, 2008

(87) PCT Pub. No.: WO2006/086954
PCT Pub. Date: Aug. 24, 2006

(65) Prior Publication Data
US 2008/0286615 A1 Nov. 20, 2008

(30) Foreign Application Priority Data
Feb. 14, 2005 (DE) .......................... 10 2005 007 180

(51) Int. Cl.
*H01M 8/04* (2006.01)
*H01M 8/24* (2006.01)

(52) U.S. Cl.
USPC ........... 429/439; 429/433; 429/434; 429/435; 429/436; 429/440

(58) Field of Classification Search
USPC .................... 429/433–440, 512–513
See application file for complete search history.

(56) References Cited

U.S. PATENT DOCUMENTS

| | | | | |
|---|---|---|---|---|
| 4,087,976 | A * | 5/1978 | Morrow et al. | 60/643 |
| 5,750,278 | A | 5/1998 | Gillett et al. | |
| 6,309,770 | B1 * | 10/2001 | Nagayasu et al. | 429/415 |
| 6,821,663 | B2 * | 11/2004 | McElroy et al. | 429/418 |
| 6,832,647 | B2 * | 12/2004 | Voss et al. | 165/111 |
| 2003/0051405 | A1 * | 3/2003 | Childress et al. | 48/127.9 |
| 2003/0054209 | A1 * | 3/2003 | Gillett et al. | 429/13 |
| 2004/0062964 | A1 * | 4/2004 | Matsuoka et al. | 429/26 |
| 2004/0229099 | A1 * | 11/2004 | Standke et al. | 429/26 |
| 2005/0170225 | A1 * | 8/2005 | Okazaki | 429/18 |

* cited by examiner

*Primary Examiner* — Raymond Alejandro
*Assistant Examiner* — Helen McDermott
(74) *Attorney, Agent, or Firm* — The Webb Law Firm

(57) ABSTRACT

According to the invention, a fuel cell is operated at a working temperature of between 60° C. and 110° C. and thermally insulated from the exterior, the waste air from the cathode being cooled by a surplus of incoming air that is provided for the reaction. The supplied fuel is pre-heated during the exchange of heat. The fuel cell that is operated according to said method can be used in systems that are restricted by exposure to thermal stress and can be produced in a cost-effective manner.

20 Claims, 1 Drawing Sheet

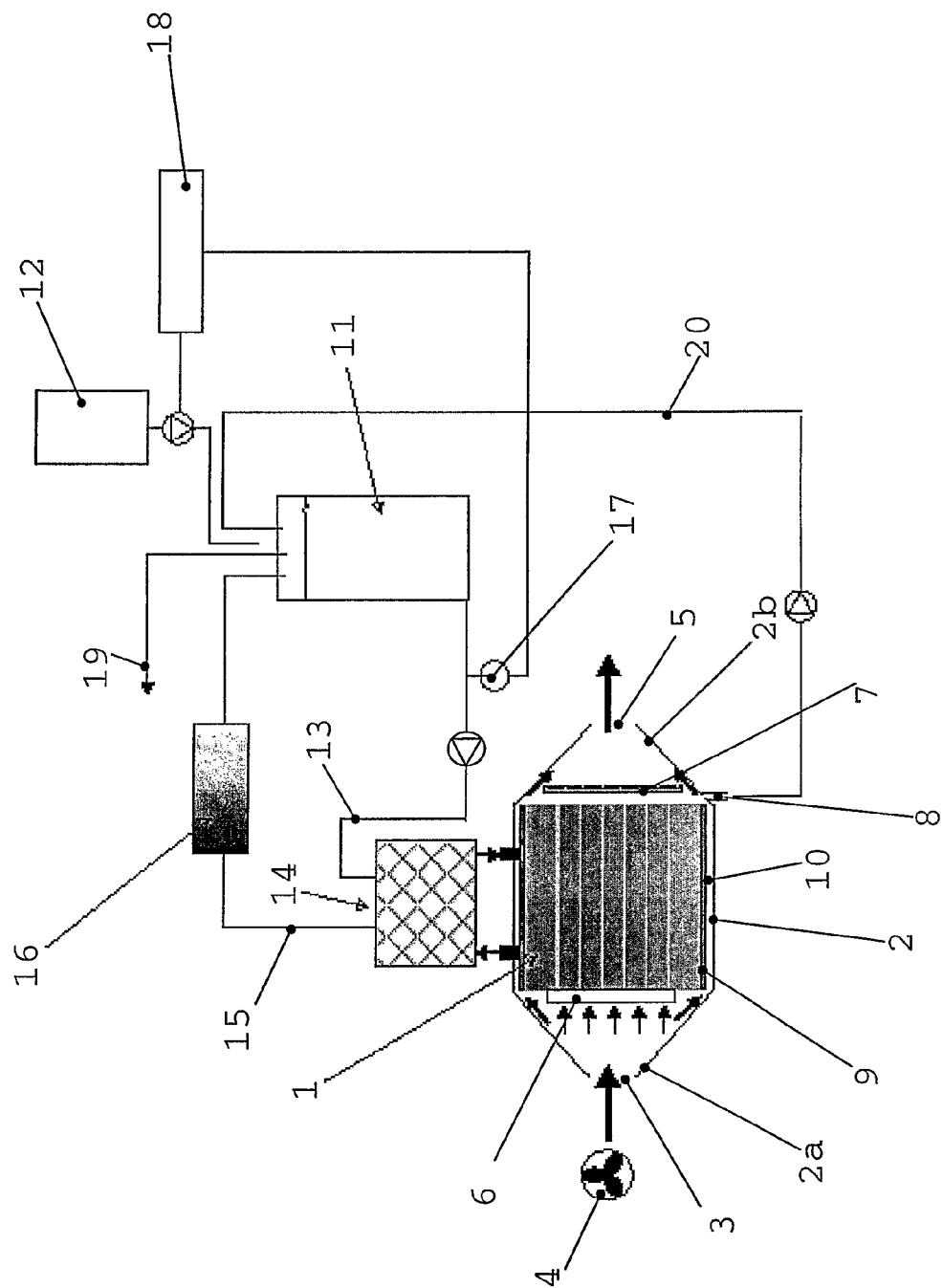

METHOD FOR OPERATING FUEL CELLS FOR SYSTEMS THAT ARE RESTRICTED BY EXPOSURE TO THERMAL STRESS AND FUEL CELL STACK FOR CARRYING OUT SAID METHOD

The invention relates to a method for operating fuel cells for systems having a limited thermal loading capacity, comprising touchable surfaces and/or heat-sensitive components, in particular a fuel cell stack operated with air and fuel. The invention further relates to fuel cells or a fuel cell stack designed for carrying out the method comprising an air source allocated to the cathode side and a downstream fuel source on the anode side.

In a fuel cell it is known that a fuel reacts with oxygen to form water in a controlled combustion. At the same time, electrical energy is generated and supplied to a consumer in an advantageous manner, that is with high efficiency and low pollutant emission. Inter alia, alcohols, hydrocarbons, hydrogen, esters or ethers are used. The oxygen supply required on the cathode side is effected, for example, by supplying ambient air whilst at the anode, hydrogen is prepared either directly or indirectly, as for example in the direct methanol fuel cell by supplying methanol. In the direct methanol fuel cell the electrochemical reaction at the anode consists in the conversion of methanol and water to give $CO_2$, $H^+$ and $e^-$. The hydrogen ions migrate through the electrolyte to the cathode whilst the free electrons are released to the electrical conductor. The oxygen at the cathode reacts with the hydrogen ions accompanied by the absorption of electrons so that water is formed as the reaction product.

In every fuel cell, it is necessary to separate the anode and the cathode from one another in such a manner that the fuel supplied on the anode side does not reach the cathode side and be oxidised there but on the other hand, proton exchange is ensured. Usually used for this purpose is a polymer electrolyte membrane which consists, for example, of a material known under the trade name Nafion® and which is coated on the anode side and the cathode side with an electrode material to form the anode and the cathode. In addition, the membrane electrode unit thus formed is coated on both sides with a catalyst material made of a precious metal (platinum, ruthenium). The membrane-electrode unit is disposed between two electrically conducting bipolar plates provided with fluid distributor structures which serve both to supply and remove the reaction educts and reaction products and also for the electrical contacting and leading off the electrical current between the anode and the cathode to the power consumers of the relevant appliance. In order to be able to supply the required level of electrical energy for operating the relevant appliance, a plurality of the previously described fuel cells is combined to form a fuel cell pile or stack which is held together in a sealing fashion by end plates provided on both sides of the stack. The expression fuel cell is always to be understood hereinafter also as a fuel cell stack which is merely designated as a stack here for the sake of simplicity.

From the point of view of the power supply to systems having a limited thermal loading capacity, for example, portable electronic appliances, the known fuel cells of the type described above are disadvantageous insofar as large active surfaces (electrode surfaces) are required to provide the necessary electrical power. On account of the expensive material (Nafion, precious metal) used for the membrane-electrode units, firstly the costs and in addition the space requirement and the weight are therefore high. On the other hand, however, in appliances with touchable surfaces and in electronic appliances, there is a limit on the operating temperature of the fuel cell, which is known to result in an increase in the power density ($W/cm^2$) of the fuel cell in an elevated temperature range, that is between 30° C. and 110° C., since the stack which is usually the hottest component of these systems, mostly must not exceed a surface temperature of 50° C. because of its possible contact with certain components having a limited thermal loading capacity. In principle, the present invention relates to fuel cells having a high operating temperature corresponding to the desired high power where, however, the permissible external temperature of the fuel cell is limited by the restricted thermal loading capacity of the system in which the fuel cell is used.

It is the object of the invention to provide a method for operating a fuel cell and to configure a fuel cell stack designed to carry out the method such that at high electrical power the permissible thermal loading of the environment is not exceeded and the stack volume and weight, and ultimately the production costs, are minimised.

According to the invention, the object is achieved by a method and by a fuel cell stack configured according to the features and developments of the invention described herein.

In other words, the basic idea of the invention is that the fuel cell is operated at a high, optimum working temperature, preferably between 60 and 110° C., to achieve the desired power but is thermally insulated and the heat accumulating as a result of the high working temperature and the thermal insulation is removed from the hot cathode waste air by means of a portion of the supplied reaction air which is branched off. A significant increase in power can be achieved with such a fuel cell or a fuel cell operated in this way without exceeding the maximum permissible external temperature of the fuel cell or thermally overloading the system supplied by said fuel cell. In addition, it was surprisingly ascertained that with a fuel cell operated and constructed using this method, a reduction in stack weight and volume and in material costs by around 75% should be attained with the known systems for the same thermal irradiation and power. In other words, this means that for the same weight, volume and cost expenditure, and still permissible heating or heat output, substantially higher powers can be achieved compared with the solutions known so far.

In one embodiment of the invention, the thermal insulation is provided by a vacuum insulating layer surrounding the fuel cell stack. In addition, the stack is surrounded by a housing to which cooling air is supplied on one side, as a surplus portion of the working air, which is fed in an annular gap between the housing and the vacuum insulation towards the opposite side of the housing. As a result, the housing is cooled and a portion of the heat produced by the high working temperature and the thermal insulation is removed from the fuel cell and in addition, the hot, moist cathode air is cooled. In order to achieve the high working temperatures which should be attained in a short time in the start-up phase of the fuel cell, the fuel supplied on the anode side in the feed pipe is pre-heated by heat exchange with the hot reaction products removed in the return pipe.

In a further embodiment of the invention, a latent heat storage material is used for heat exchange between the feed and return pipes, the melting point of said heat storage device being slightly below the respective working temperature of the fuel cell. The latent heat storage device can also be integrated in the fuel cell stack.

An exemplary embodiment of the invention is explained in detail with reference to the drawing in which the single FIGURE shows a process diagram for the operation of a direct methanol fuel cell according to the invention.

The direct methanol fuel cell stack 1 comprises a plurality of alternately arranged membrane electrode units and bipolar plates which are held pressed together between end plates (in each case not shown). The stack is surrounded by a housing 2 which in the air inlet part 2a, comprises an air inlet opening 3 with upstream fan 4 for supplying fresh air to the cathode side of the individual fuel cells and in the air outlet part 2b located on the opposite side, comprises an air outlet opening 5 for removing hot moist waste air from the cathode. In the air inlet part 2a of the housing 2, an air distributor 6 made of a plate-shaped sintered or fleece material for a uniformly distributed air supply to the cathode side of the individual fuel cells is located upstream of the fuel cell stack 1. Located on the opposed air outlet side of the fuel cell stack 1, inside the air outlet part 2b of the housing 2 is a waste air cooler 7, plate-shaped in this case, for cooling and removing moisture from the hot moist cathode waste air leaving the fuel cell stack 1. Also provided in the air output part 2b is a condensation drain opening 8. The fuel cell stack 1 is surrounded on its outer circumference by a heat-insulating layer 9 consisting of a vacuum insulating material having a high insulating effect and correspondingly small layer thickness. The housing 2 surrounds the fuel cell stack 1 on the circumference at a short distance from the heat insulating layer 9 so that a narrow annular gap 10 is formed between this and the inner circumferential surface of the housing 2, which connects the air inlet part 2a of the housing 2 to the air outlet part 2b.

Fuel is supplied to the anode side of the fuel cells from a fuel-water container 11 which is fed from a fuel tank 12, in this case filled with methanol. The methanol-water mixture is fed via a feed pipe 13 and a heat exchanger 14, operating on the basis of a latent heat storage material consisting of paraffin in this case, into the fuel cell stack whilst the depleted methanol solution is fed via a return pipe 15 to which the heat exchanger 14 and a recooler 16 are connected, back into the fuel-water container 11. Located in the feed pipe 13 is a fuel sensor 17 which is connected to a controller 18 for the fuel supply. Located in the fuel-water container 11 is a gas outlet valve 19 for removing the $CO_2$ formed in the fuel cell process. In addition, the fuel-water container 11 is connected via a pipeline 20 to the condensation drain opening 8.

In the present exemplary embodiment the fuel cell stack 1 is operated at a temperature of 90° C. to achieve a high power density. The methanol-water mixture supplied to the fuel cell stack 1 is pre-heated with the aid of the heat exchanger 14 in the feed pipe 13. The storage material of the heat exchange constructed as a latent heat storage device has a melting point slightly below the operating temperature of the fuel cell stack. In particular, during the starting up of the fuel cell stack 1, the heating of the fuel made possible with the latent heat storage material allows the operating temperature to be reached rapidly and therefore rapid starting of the power generation process. Air is introduced into the air inlet part 2a by means of the fan 4 and fed via the air distributor 6 to the cathode of the fuel cells of the fuel cell stack 1. However, a large portion of the supplied air is fed for cooling via the annular gap 10 into the air outlet part 2b of the housing 2 in order to cool the hot cathode waste air leaving the fuel cell stack 1 as a result of the high operating temperature. The warm moist cathode waste air impinges upon the waste air cooler 7 cooled by the cool air and is cooled. The water condensing on the waste air cooler 7 at the same time enters the fuel-water container 11 via the condensation drain opening 8 and the pipeline 20. In particular, the heat insulating layer 9 provided on the circumference of the fuel cell stack 1 limits the surface temperature to be expected as a result of the high operating temperature and the emitted heat to a permissible value for components with touchable surfaces and electronic elements. Air passing through the annular gap 10 brings about additional cooling. The depleted methanol solution emerging at the elevated operating temperate is passed via the heat exchanger 14 and subsequently via the recooler 16 and thereby cooled to a temperature below 50° C. and then enters into the fuel-water container 11.

As a result of the high operating temperature (in the present exemplary embodiment 90° C.) which can be achieved with the stack described previously, the power density ($W/cm^2$) of the fuel cell can be increased substantially or the active area and therefore the stack volume and weight can be reduced substantially compared with a non-insulated and non-cooled stack having the same power, operated at a lower temperature. In the case of the stack described above having a power of 50 W, an operating temperature of 90° C. and a surface temperature not exceeding 50° C. as a result of the insulation and cooling according to the invention, the active area and therefore the precious metal and Nafion requirement can be reduced by about 75% and the volume can be reduced by about 60% compared with a known stack having the same power and surface temperature.

REFERENCE LIST

1 Fuel cell stack
2 Housing
2a Air inlet part
2b Air outlet part
3 Air inlet opening
4 Fan
5 Waste air opening
6 Air distributor
7 Waste air cooler
8 Condensation drain opening
9 Heat insulating layer
10 Annular gap
11 Fuel-water container
12 Fuel tank
13 Feed pipe
14 Heat exchanger (latent heat storage device)
15 Return pipe
16 Recooler
17 Fuel sensor
18 Controller
19 Gas outlet valve
20 Pipeline

The invention claimed is:

1. A fuel cell stack (1) operated with air and fuel, which is thermally insulated towards an exterior thereof, which is surrounded by a housing (2) at a distance and an annular gap (10) is formed between the fuel cell stack (1) and the housing (2), said gap (10) being connected to an air inlet part (2a) which is connected to an air source for supplying working air to the fuel cell stack (1), and comprising a heat insulating layer (9), wherein the heat insulating layer (9) surrounds the fuel cell stack (1) and the annular gap is formed between the heat insulating layer (9) and the housing (2), the air inlet part (2a) is connected to the fuel cell stack (1) and also to the annular gap (10) for supplying a portion of incoming air, and the air inlet part (2a) is connected via the annular gap (10) to an air outlet part (2b), into which hot cathode waste air and additional air supplied via the annular gap (10) enters and which contains a waste air cooler (7) for cooling the hot cathode waste air with the additional air, wherein the waste air cooler (7) is a plate-shaped body which is acted upon with hot moist cathode waste air on one side and with the additional air on the other side, wherein heat accumulating as a result of an elevated operating temperature between 60° C. and 110° C. is removed, and wherein the emerging hot and moist cathode waste air is cooled with a dominant portion of the supplied additional air directly by mixing or indirectly via the waste air cooler and at the same time, a water fraction condenses out.

2. The stack according to claim 1, wherein the heat insulating layer consists of a vacuum insulating material.

3. The stack according to claim 1, wherein located in the air inlet part is an air distributor for a uniformly distributed air supply to the fuel cell stack and for transferring a portion of the incoming air used for cooling via the annular gap to the waste air cooler.

4. The stack according to claim 3, wherein the air distributor is a plate made of a sintered material or fleece material located upstream of the stack.

5. The stack according to claim 1, further including a condensation drain opening for removing water condensing out from the hot cathode waste air at the waste air cooler and provided in the air outlet part.

6. The stack according to claim 5, wherein the condensation drain opening is connected to a fuel-water container via a pipeline.

7. The stack according to claim 1, wherein a fuel source allocated to said stack is a fuel tank with a downstream fuel-water container and further including a heat exchanger incorporated in a feed pipe and a return pipe for pre-heating a supplied fuel and for cooling returned reaction products in the fuel-water container.

8. The stack according to claim 7, wherein the heat exchanger is constructed as a latent heat storage device whose latent heat storage material has a melting point below the operating temperature of the stack.

9. The stack according to claim 8, wherein the latent heat storage device is integrated in the stack.

10. The stack according to claim 8, wherein incorporated in the return pipe between the stack and the fuel-water container is a recooler for further cooling of the returned reaction products fed into the fuel-water container to a temperature below 50° C.

11. The fuel cell stack according to claim 1, wherein the fuel supplied on an anode side is a methanol-water mixture, wherein the fuel is pre-heated by heat exchange and the reaction products emerging on the anode side are cooled.

12. The fuel cell stack according to claim 11, wherein the heat exchange takes place via a latent heat storage material whose melting point is below the operating temperature of the fuel cell stack.

13. A method for operating fuel cell stacks according to the features of claim 1, in particular a fuel cell stack operated with air and fuel, which is thermally insulated towards the exterior and is cooled in an annular gap in the housing and which has a high working temperature corresponding to the desired power, wherein the large amount of heat accumulating as a result of the elevated operating temperatures is removed with the surplus incoming air which goes beyond the air requirement of the fuel cell and which is supplied to the hot cathode waste air via the annular gap.

14. The method according to claim 13, wherein the operating temperature is between 60° C. and 110° C.

15. The method according to claim 13, wherein the operating temperature is between 65° C. and 90° C.

16. The method according to claim 13, wherein the operating temperature is between 70° C. and 80° C.

17. The method according to claim 13, wherein the emerging hot and moist cathode waste air is cooled with a dominant portion of the supplied air directly by mixing or indirectly via a waste air cooler and at the same time, a water fraction condenses out.

18. The method according to claim 17, wherein the condensation water is collected and returned to the process.

19. The method according to claim 13, wherein the fuel supplied on the anode side is a methanol-water mixture, wherein the fuel is pre-heated by heat exchange and the reaction products emerging on the anode side are cooled.

20. The method according to claim 19, wherein the heat exchange takes place via a latent heat storage material whose melting point is slightly below the operating temperature of the fuel cell stack.

* * * * *

UNITED STATES PATENT AND TRADEMARK OFFICE
CERTIFICATE OF CORRECTION

PATENT NO. : 8,603,694 B2  Page 1 of 1
APPLICATION NO. : 11/816181
DATED : December 10, 2013
INVENTOR(S) : Cremers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1673 days.

Signed and Sealed this
Twenty-second Day of September, 2015

Michelle K. Lee
*Director of the United States Patent and Trademark Office*